(12) United States Patent
Hauck et al.

(10) Patent No.: US 12,263,739 B2
(45) Date of Patent: Apr. 1, 2025

(54) METHOD OF OPERATING AN ELECTRIC VEHICLE AND ELECTRIC VEHICLE

(71) Applicant: SEW-EURODRIVE GMBH & CO. KG, Bruchsal (DE)

(72) Inventors: Matthias Hauck, Schwetzingen (DE); Patrick Weis, Wössingen (DE); Gero Bockelmann, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 373 days.

(21) Appl. No.: 17/787,635

(22) PCT Filed: Dec. 2, 2020

(86) PCT No.: PCT/EP2020/025558
§ 371 (c)(1),
(2) Date: Jun. 21, 2022

(87) PCT Pub. No.: WO2021/121655
PCT Pub. Date: Jun. 24, 2021

(65) Prior Publication Data
US 2022/0410725 A1 Dec. 29, 2022

(30) Foreign Application Priority Data

Dec. 18, 2019 (DE) .......................... 102019008788.7

(51) Int. Cl.
*B60L 15/28* (2006.01)
*B60L 50/40* (2019.01)
(Continued)

(52) U.S. Cl.
CPC ............... *B60L 15/28* (2013.01); *B60L 50/40* (2019.02); *B60L 53/32* (2019.02); *H02J 7/345* (2013.01)

(58) Field of Classification Search
CPC .......... B60L 15/28; B60L 50/40; B60L 53/32; B60L 2200/42; B60L 2200/44;
(Continued)

(56) References Cited

U.S. PATENT DOCUMENTS 5,323,098 A 6/1994 Hamaguchi
6,265,851 B1 7/2001 Brien et al.
(Continued)

FOREIGN PATENT DOCUMENTS

CH 701287 B1 * 12/2010 .............. H02J 7/345
CN 202586423 U * 12/2012
(Continued)

OTHER PUBLICATIONS

DE-102009014386-A1 English Translation (Year: 2010).*
(Continued)

*Primary Examiner* — James A Shriver, II
*Assistant Examiner* — Michael T. Walsh
(74) *Attorney, Agent, or Firm* — Carter, DeLuca & Farrell LLP

(57) ABSTRACT

In a method for operating an electric vehicle, including a first energy storage device (e.g., a rechargeable battery storage device), a second energy storage device (e.g., a double-layer capacitor device), an energy supply unit which provides energy, for charging the first and/or second energy storage device, and a first electrical consumer connected to the second energy storage device via an intermediate circuit, the first energy storage device is connected to the energy supply unit via a bidirectional converter unit, the second energy storage device is connected to the energy supply unit, a first power flows from the first energy storage device to the second energy storage device if an intermediate circuit
(Continued)

voltage falls below a definable voltage, and a second power flow from the second to the first energy storage device is prevented.

26 Claims, 4 Drawing Sheets

(51) Int. Cl.
  *B60L 53/30* (2019.01)
  *H02J 7/34* (2006.01)
(58) Field of Classification Search
  CPC ... B60L 5/00; H02J 7/345; H02J 1/082; H02J 7/007182; H02J 2310/48; Y02P 90/60; Y02T 10/64; Y02T 10/70; Y02T 10/72; Y02T 90/12
  See application file for complete search history.

(56) References Cited

U.S. PATENT DOCUMENTS

| | | | |
|---|---|---|---|
| 7,956,569 B2 | 6/2011 | Welchko | |
| 9,889,867 B2 * | 2/2018 | Johnson | B61L 5/06 |
| 10,988,027 B2 | 4/2021 | Salter | |
| 11,067,050 B2 | 7/2021 | Shields | |
| 11,491,889 B2 * | 11/2022 | Blickle | B60L 53/80 |
| 2008/0277173 A1 | 11/2008 | Midrouillet | |
| 2012/0037440 A1 | 2/2012 | Baer | |
| 2012/0074894 A1 * | 3/2012 | Chen | B60L 58/20 |
| | | | 320/103 |
| 2016/0152129 A1 | 6/2016 | West | |
| 2016/0297307 A1 * | 10/2016 | Hinterberger | B60L 50/51 |
| 2017/0129342 A1 | 5/2017 | Tajima | |
| 2019/0389328 A1 | 12/2019 | Blickle | |

FOREIGN PATENT DOCUMENTS

| | | | | |
|---|---|---|---|---|
| CN | 205489522 U | * | 8/2016 | |
| CN | 205489678 U | * | 8/2016 | |
| DE | 69119168 T2 | | 8/1996 | |
| DE | 19545544 A1 | | 12/1996 | |
| DE | 102007002242 A1 | * | 7/2008 | ........... G05D 1/0265 |
| DE | 102008034668 A1 | | 5/2009 | |
| DE | 102009014386 A1 | * | 9/2010 | .......... B60L 11/1803 |
| DE | 102009017556 A1 | | 10/2010 | |
| DE | 202016002428 U1 | * | 7/2016 | ........... B60L 11/005 |
| DE | 102015004701 A1 | | 10/2016 | |
| DE | 102016007088 B3 | * | 6/2017 | ................ B60L 1/00 |
| DE | 102016200663 A1 | * | 7/2017 | .............. B60L 3/003 |
| DE | 102017005153 A1 | | 12/2017 | |
| DE | 102017010924 A1 | | 6/2018 | |
| DE | 202018003439 U1 | | 9/2018 | |
| DE | 102018111469 A1 | | 11/2018 | |
| DE | 202019102019 U1 | | 4/2019 | |
| EP | 3042405 B1 | | 10/2018 | |
| RU | 74107 U1 | * | 6/2008 | |
| WO | WO-2019049009 A1 | * | 3/2019 | |

OTHER PUBLICATIONS

RU-74107-U1 English Translation (Year: 2008).*
CH-701287-B1 English Translation (Year: 2010).*
CN-202586423-U English Translation (Year: 2012).*
DE-102016007088-B3 English Translation (Year: 2017).*
International Report on Patentability issued in corresponding International Application No. PCT/EP2020/025558 dated May 17, 2022, pp. 1-6, English Translation.
International Search Report issued in corresponding International Application No. PCT/EP2020/025558 dated Mar. 16, 2021, pp. 1-2, English Translation.

* cited by examiner

METHOD OF OPERATING AN ELECTRIC VEHICLE AND ELECTRIC VEHICLE

FIELD OF THE INVENTION

The present invention relates to a method for operating an electric vehicle and an electric vehicle.

BACKGROUND INFORMATION

In certain conventional systems, a driverless, mobile assistance system is provided as the electric vehicle. Alternatively, such a vehicle can also be characterized as a driverless transport vehicle (FTF) or AGV (automated guided vehicle).

A driverless transport vehicle for transporting loads is described in German Patent Document No. 10 2007 002 242. Such a load transport can be characterized as an intralogistic application. The driverless transport vehicle is supplied with energy inductively.

A floor conveyor system is described in German Patent Document No. 195 45 544, in which the vehicles are supplied with electrical energy via contact conductors. In order to operate the vehicle even when there is no external energy supply, electrolytic or gold-cap capacitor storage devices, also known as ultracapacitors, supercapacitors, or double-layer capacitors, are used as the electrical energy source.

An ultracapacitor power supply for an electric vehicle is described in U.S. Pat. No. 6,265,851. This electric vehicle has two energy storage devices that can optionally be used to drive the vehicle.

A driverless transport system is described in European Patent Document No. 2 419 364, which has two energy storage devices—a double-layer capacitor device and a battery device. In normal operation, the double-layer capacitor device supplies the drive device, i.e., the motor, with energy.

In an emergency, i.e., if the voltage in the double-layer capacitor device falls below a certain level, the system switches to battery operation. The drive device is then supplied with energy exclusively by the battery device until the double-layer capacitor device is recharged at a charging station.

German Patent Document No. 10 2017 005 153 describes a method for operating an electric vehicle and an electric vehicle, in which the vehicle has a hybrid storage device and a double-layer capacitor device. Both storage devices can optionally supply the drive device with energy.

A charging station and an associated electric vehicle are described in U.S. Patent Application Publication No. 2008/0277173.

SUMMARY

Example embodiments of the present invention provide for refining and improving the energy management of an electric vehicle, e.g., of a driverless, mobile assistance system which has two different types of energy storage devices.

According to an example embodiment of the present invention, in a method for operating an electric vehicle, e.g., a driverless, mobile assistance system (MAS) for an intralogistic application, the vehicle has a first energy storage device which is arranged, e.g. as a rechargeable battery storage device, a second energy storage device which is arranged, e.g., as a double-layer capacitor device and/or which can be charged and discharged, e.g., faster than the first energy storage device, an energy supply unit which provides energy, e.g., periodically, for charging the first energy storage device and/or the second energy storage device, and a first electrical consumer, e.g., a drive device for the travel movement of the vehicle or a lifting device or a handling device. The first electrical consumer is connected to the second energy storage device via an intermediate circuit. There is an intermediate circuit voltage in the intermediate circuit. The first energy storage device is connected to the energy supply unit via a bidirectional converter unit, and the second energy storage device is connected to the energy supply unit. There is a first power flow from the first energy storage device to the second energy storage device if the intermediate circuit voltage falls below a definable voltage, and a second power flow from the second energy storage device to the first energy storage device is prevented, e.g., at any time.

Two energy storage devices are therefore used to supply an electrical consumer with energy. The second energy storage device is connected directly to the electrical consumer via the so-called intermediate circuit. For example, several electrical consumers can also be connected to the second energy storage device via the intermediate circuit. The consumers are therefore connected in parallel to the second energy storage device. The second energy storage device supplies the electrical consumer or consumers with the necessary energy, but it can also absorb energy supplied back from the electrical consumer or from the electrical consumers. A power flow from the second to the first energy storage device being prevented, e.g., at all times, provides that the energy stored in the second energy storage device is only available to the electrical consumers of the vehicle. The second energy storage device is thus prevented from recharging the first energy storage device at all times. The first energy storage device is used to charge the second energy storage device as soon as the voltage in the intermediate circuit falls below a definable voltage. In this instance, therefore, there is a power flow from the first to the second energy storage device. The first energy storage device, for example, has a greater capacity than the second energy storage device and thus compensates for the weakness of the lower energy content of the second energy storage device. The second energy storage device is, for example, dimensioned such that it can buffer short-term power peaks from consumers. The first energy storage device is dimensioned more for the continuous, i.e., average, power consumption of the consumers.

The advantage is that the second energy storage device is always charged at least up to the definable voltage, i.e., always has at least a definable energy content.

The second energy storage device is, for example, arranged as a double-layer capacitor device and/or the second energy storage device can be charged and discharged faster than the first energy storage device. A double-layer capacitor device can be charged in a few seconds and fully discharged to zero voltage. Its cycle stability is in the range of 1 million, so it has a very high number of charge/discharge cycles. It is therefore, for example, suitable for supplying electrical consumers of the electric vehicle with peak power.

The first energy storage device is, for example, arranged as a battery storage device. The battery storage device can be charged and discharged more slowly than a double-layer capacitor device. The first energy storage device, for example, has a higher energy density and has a lower power density and a lower number of possible charge/discharge cycles in comparison with the second energy storage device. An example of a battery storage device is an arrangement of one or more secondary electrochemical elements, e.g., based on nickel and/or iron. Such a secondary electrochemical element includes a negative electrode, a positive electrode, a porous separator which separates the negative and the positive electrode from one another, and an electrolyte, e.g., an aqueous alkaline electrolyte, with which the electrodes and the separator are saturated. Such a secondary electrochemical element based on nickel and/or iron is capable, like a capacitor, of providing high pulse currents very quickly, but otherwise it exhibits more of a battery behavior, e.g., the capacitor equations $Q=C\,U$ and $W=\frac{1}{2}\,C\,U^2$ do not apply to this battery storage device. Such a battery storage device has a higher cycle stability. This cycle stability is in the range between 1,000 and 20,000. Charge and discharge cycles can therefore be carried out more frequently before the performance criteria of the battery storage device are no longer met. In addition, the battery storage device has overcharge stability and deep discharge stability. It can be charged quickly up to 15 C. Another example of a battery storage device is a lithium-ion battery.

According to example embodiments, the first electrical consumer is a drive device for the travel movement, e.g., traction, of the vehicle or a lifting device or a handling device.

These consumers each include, for example, a drive motor, e.g., a three-phase AC motor, which is supplied with three-phase voltage from an inverter. The inverter, in turn, is connected to the intermediate circuit and converts the DC voltage into three-phase current.

According to example embodiments, energy is supplied to the energy supply unit with or without contact.

The advantage of the contact-type energy supply is that the energy storage device can be charged, for example, by a plug.

The advantage of the contactless energy supply is that the energy storage device can be safely charged, for example, by induction.

According to example embodiments, the energy supply unit includes a rectifier, which is supplied from a secondary inductor of the electric vehicle, e.g., to which a capacitor is connected in series or in parallel such that the resonant frequency of the resonant circuit formed in this manner is equal to the frequency of an alternating current applied to a stationary primary inductor. The inductive transfer of energy also increases safety and there is no wear and tear on the charging contacts that would otherwise be required. In addition, a safe-to-touch arrangement can be implemented.

According to example embodiments, the energy supply unit is supplied with energy periodically during the trip.

The advantage is that the energy can be supplied in sections of the route and thereby the two energy storage devices can either be recharged or kept in a fully charged state, and the service life thereof can therefore be extended, since they are exposed to as few full charging cycles as possible, e.g., completely charged and discharged less frequently. Aging is thus reduced. The power supply can be implemented with contact, for example, by contact conductors. Alternatively, a primary conductor is arranged, in a stationary manner, along the route, which primary conductor transmits energy inductively to a secondary inductor arranged in the electric vehicle.

According to example embodiments, the second energy storage device has an end-of-charge voltage and an end-of-discharge voltage, and the value of the definable voltage is greater than the value of the end-of-discharge voltage and less than the value of the end-of-charge voltage.

The advantage is that the electrical consumer can be dimensioned with regard to the value of the definable voltage. The value of the definable voltage can also be characterized as the switching point. This is the point at which the first energy storage device is used to supply energy to the intermediate circuit or the second energy storage device in order to keep the voltage at the value of the definable voltage. This results in the advantage that the electrical consumer must draw less current at the same power level, and therefore the electrical consumer can be dimensioned for lower maximum currents and a lower operating voltage range. In the case of electric motors, the motor can therefore also be dimensioned smaller mechanically, i.e., smaller motor sizes can be used.

Typical values for the end-of-charge voltage $U_1$ and end-of-discharge voltage $U_3$ are $U_1=360$ V and $U_3=120$ V. Assuming that only the second energy storage device is used and that the maximum permissible current for the electrical consumer is $I_{V,max}=10$ A, it follows that the electrical consumer may have a maximum power of $P_{V,max}=1,200$ W. This is the only manner of ensuring that the second energy storage device can always provide the required power for the electrical consumer. However, if the first energy storage device is also used and the switching point is set to $U_2=150$ V, for example, a maximum current of $I_{V,max}=1,200$ W/150 V=8 A results at the same power $P_{V,max}=1,200$ W.

According to example embodiments, the value of the definable voltage depends on the average power required by the first electrical consumer.

The advantage is that the power that is transferred from the first energy storage device to the second energy storage device corresponds to the average, that is to say the mean, power of the electrical consumer. As a result, the second energy storage device can be dimensioned smaller; it only has to buffer the power peaks. The first energy storage device handles the base load, i.e., the average load.

According to example embodiments, the vehicle has a vehicle controller for controlling the travel movement, e.g., in which the vehicle controller receives commands from a higher-level controller, e.g., wirelessly. The vehicle controller can, for example, be supplied with energy from the first energy storage device. For example, a battery storage device, for example, a lithium-ion battery, can be used for the first energy storage device, the voltage level of which is in the low-voltage range, e.g., 12 V or 24 V or 48 V or 96 V.

According to example embodiments, the value of the definable voltage is varied dynamically while the vehicle is in operation.

The advantage is that it is possible to react to changed situations of an intralogistic application. If, for example, it is known that different average power levels are required for different sections of the trip, the value of the definable voltage can be adapted for the various respective sections of the trip. The value of the definable voltage can be adapted, for example, by the vehicle controller. In the case of several electrical consumers, for example, a drive device and a lifting device, it is possible, for example, that the value of the definable voltage for a route between two work stations is set differently than for loading and unloading a load using the lifting device when the vehicle is stationary.

According to example embodiments, the value of the definable voltage is equal to the quotient of the maximum power required by the first electrical consumer and the maximum permissible current for the first electrical consumer.

The advantage is that the mode of operation of the second energy storage device can be adapted to the needs of the electrical consumer.

According to example embodiments, the second power flow is prevented by a diode arranged between the second energy storage device and the converter device.

The advantage is that the prevention of the second power flow is readily implemented.

According to example embodiments, an actual value of a charge-reversal current flowing between a first connection point and a second connection point is detected, e.g., by a current-measuring device, in which the first connection point is connected to the energy supply unit and to the converter device, and the second connection point is connected to the second energy storage device and to the electrical consumer.

The second power flow is prevented to the extent that the converter device is deactivated, at least for charging the first energy storage device, if the detected actual value of the charge-reversal current falls below a minimum charge-reversal current limit value, which, for example, is not negative.

The advantage is that the prevention of the second power flow is achieved by control technology, and a diode between the first energy storage device and the second energy storage device can be dispensed with. The function of the diode is thus simulated using control technology. The converter device is deactivated in the process, at least for the charging process of the first energy storage device, if the actual value of the current-measuring device is less than the minimum charge-reversal current limit value. This ensures that no energy from the second energy storage device is supplied to the first energy storage device. In other words, if there is no external energy supply and the charge-reversal current falls below a minimum charge-reversal current limit value, the bidirectional converter unit becomes a unidirectional converter device that only allows power flows from the first energy storage device. Alternatively, the deactivation can also take place completely, so that power flow is no longer possible from or to the first energy storage device.

The following descriptions for the flowing currents apply to example embodiments of the present invention:

If the vehicle has an external power supply, the energy supply unit provides a supply current. This supply current can be used to charge the first energy storage device and/or to charge the second energy storage device and/or to supply energy to the first electrical consumer. The supply current always has a positive value, since the energy supply unit is only intended for energy supply and not for energy recovery.

The current flowing through the converter device is referred to as the first charging current. The first charging current is positive when energy is being supplied to the first energy storage device, i.e., it is being charged. The first charging current is correspondingly negative when energy is being drawn from the first energy storage device, i.e., when it is being discharged.

Correspondingly, the current flowing through the second energy storage device is referred to as the second charging current. The second charging current is positive when energy is being supplied to the second energy storage device, i.e., it is being charged. The second charging current is correspondingly negative when energy is being drawn from the second energy storage device, i.e., when it is being discharged.

The current flowing through the first electrical consumer is referred to as the load current. The load current is positive when energy is being supplied to the first electrical consumer. This is when, for example, a drive motor is operated as a motor. The load current is correspondingly negative because the first electrical consumer supplies energy back into the intermediate circuit. This is when, for example, a drive motor is operated as a generator.

Finally, a charge-reversal current flows between the first energy storage device and the second energy storage device. The charge-reversal current is the difference between the supply current and the first charging current. If there is no external energy supply, i.e., the supply current is zero, the charge-reversal current corresponds to the negative charging current. In addition, the charge-reversal current is divided into the second charging current and the load current. The charge-reversal current is therefore the sum of the second charging current and the load current. The charge-reversal current is positive when current is flowing from the first energy storage device or from the energy supply unit in the direction of the second energy storage device or the first electrical consumer. A negative charge-reversal current therefore means that a current is flowing from the second energy storage device or from the first electrical consumer in the direction of the first energy storage device or the energy supply unit.

According to example embodiments, an actual value of a charge-reversal current flowing between a first connection point and a second connection point is detected, e.g., by a current-measuring device, in which the first connection point is connected to the energy supply unit and converter device, and the second connection point is connected to the second energy storage device and to the electrical consumer. An actual value of the intermediate circuit voltage is detected, e.g., by a voltage measurement. The converter device includes a throttle, a DC voltage converter, and a regulator with a cascade controller, and the second power flow is prevented in that the cascade controller sets or regulates a converter voltage present at the DC-DC converter, as a function of the detected actual values of the charge-reversal current and the intermediate circuit voltage, such that a negative charge-reversal current is prevented.

The advantage is that the prevention of the second power flow is achieved by control technology, and a diode between the first energy storage device and the second energy storage device can be dispensed with. The function of the diode is thus simulated using control technology. For example, if the actual value of the charge-reversal current falls below the charge-reversal current limit, the converter device is not immediately completely deactivated, but the first charging current is only limited, so that further charging of the first energy storage device by the energy supply unit is still possible and, at the same time, the second power flow is prevented.

According to example embodiments, the first power flow from the first energy storage device to the second energy storage device takes place when the intermediate circuit voltage is less than the end-of-charge voltage and the voltage in the first energy storage device is above a definable minimum voltage.

The advantage is that the second energy storage device can be charged to a higher voltage as long as power reserves are still available on the first energy storage device.

According to example embodiments, the cascade controller incudes a current regulator with a superimposed voltage regulator and a limiter arranged between the voltage regulator and the current regulator, in which the limiter limits a target value for the charge-reversal current to values that are greater than a minimum charge-reversal current limit value, which, for example, is not negative.

The advantage is that the cascade controller provides for the second energy storage device to be regulated at a defined voltage value and the charge-reversal current is controlled at the same time.

According to example embodiments, the vehicle includes, in addition to the first electrical consumer, further electrical consumers, and all electrical consumers are connected to the second energy storage device via the intermediate circuit, e.g., in parallel.

The advantage is that energy can be exchanged via the intermediate circuit. If, for example, a drive motor of a drive device is being operated as a generator, the energy generated can be used, for example, to operate a lifting device on the vehicle.

According to an example embodiment of the present invention, an electric vehicle, e.g., adapted to perform the method described herein, includes a first energy storage device arranged, for example, as a rechargeable battery storage device, a second energy storage device arranged, for example, as a double-layer capacitor device and/or which can be charged and discharged, e.g., faster than the first energy storage device, an energy supply unit which provides energy, e.g., periodically, for charging the first energy storage device and/or the second energy storage device, and a first electrical consumer which is connected to the second energy storage device via an intermediate circuit, in which there is an intermediate circuit voltage in the intermediate circuit. The first energy storage device is connected to the energy supply unit via a bidirectional converter unit, and the second energy storage device is connected to the energy supply unit. The vehicle is configured such that there is a first power flow from the first energy storage device to the second energy storage device if the intermediate circuit voltage falls below a definable voltage, and that a second power flow from the second energy storage device to the first energy storage device is prevented.

This results in the same advantages as in the method.

According to example embodiments, the energy supply unit is arranged as a controllable power source.

The advantage is that this can be readily implemented, e.g., for an inductively coupled energy supply unit.

According to example embodiments, the first energy storage device is arranged on the electric vehicle in such a separable manner that it is possible to replace the first energy storage device.

The advantage is that when the first energy storage device wears out, it can be replaced. The first energy storage device is therefore not permanently mounted or integrated in the vehicle, but is detachably attached to the vehicle. For example, when safety extra-low voltage is used for the first energy storage device, the advantage is that the first energy storage device can also be replaced by a person who is not correspondingly trained. This is particularly advantageous when the first energy storage device is not configured for the service life of the vehicle and is therefore a wear part.

According to example embodiments, overvoltage protection and/or undervoltage protection and/or overcurrent protection is provided on the first energy storage device by a current measurement and/or voltage measurement, and/or overtemperature protection is provided on the first energy storage device by a temperature measurement, and/or overvoltage protection and/or overcurrent protection is provided on the second energy storage device by a current measurement and/or voltage measurement, and/or overtemperature protection is provided on the second energy storage device by a temperature measurement.

The advantage is that the safety of the energy storage devices is increased, and they are not damaged. This is particularly important in the case when energy is supplied back into an energy storage device by a consumer.

Further features and aspects of example embodiments of the present invention are described in more detail below with reference to the appended schematic Figures.

BRIEF DESCRIPTION OF THE DRAWINGS

A mobile assistance system according to an example embodiment of the present invention with a consumer is schematically illustrated in FIG. 1. The mobile assistance system is also referred to below as MAS.

Figure 3:
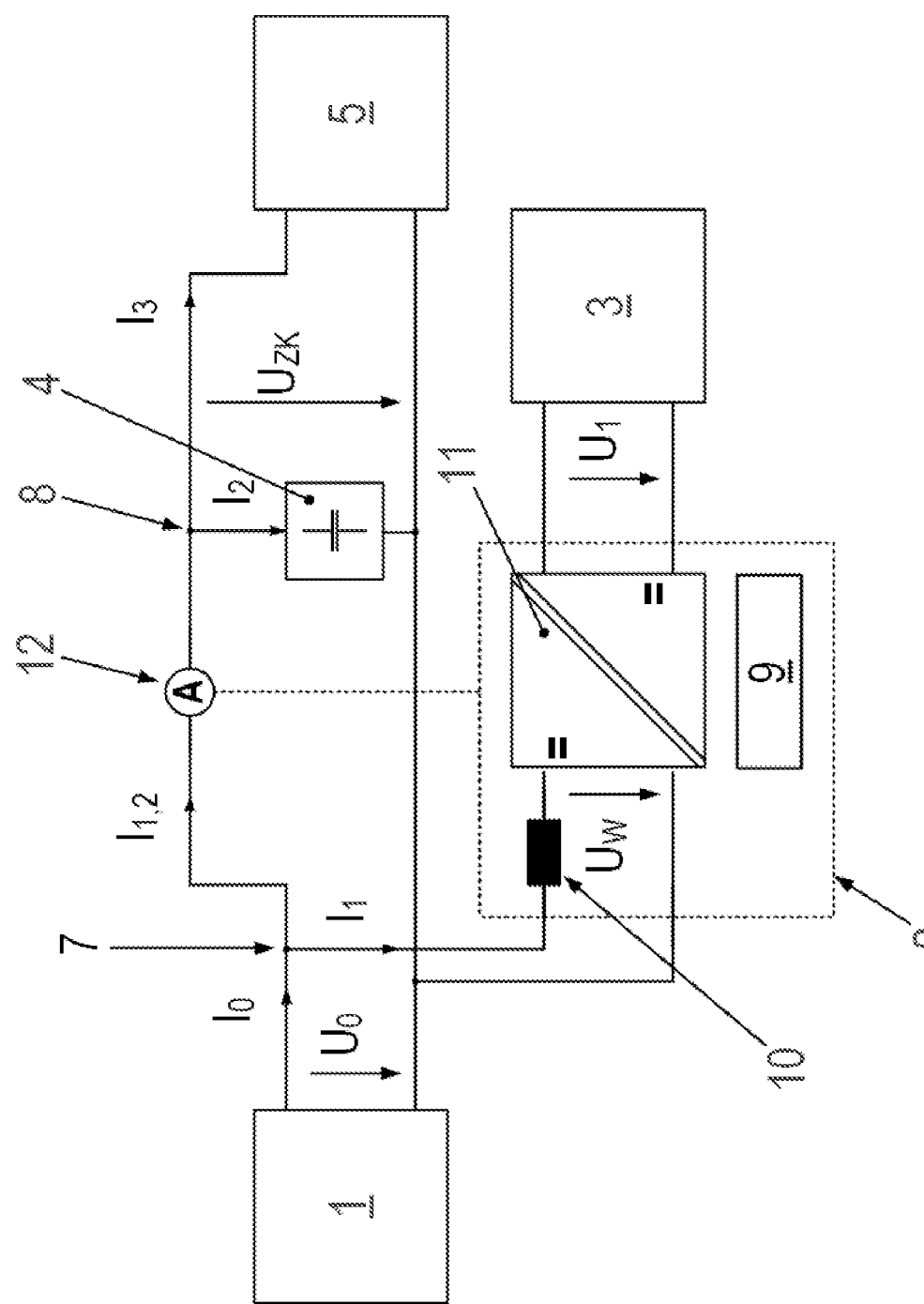

A mobile assistance system according to an example embodiment of the present invention with a consumer is schematically illustrated in FIG. 3.

Figure 4:
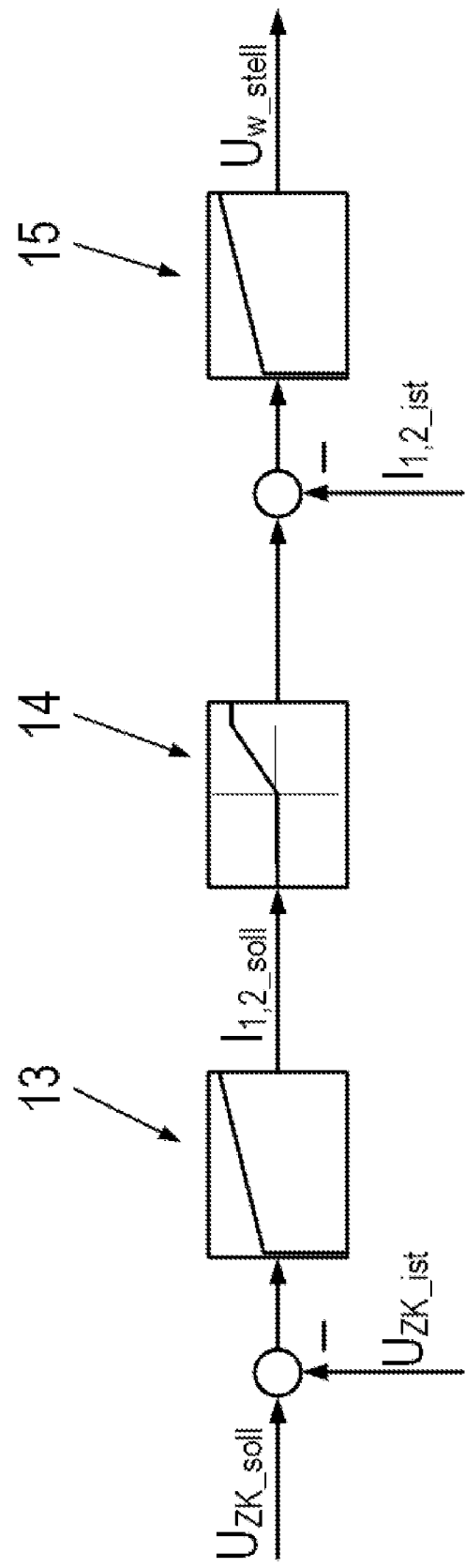

A regulator structure is schematically illustrated in FIG. 4.

DETAILED DESCRIPTION

Figure 1:
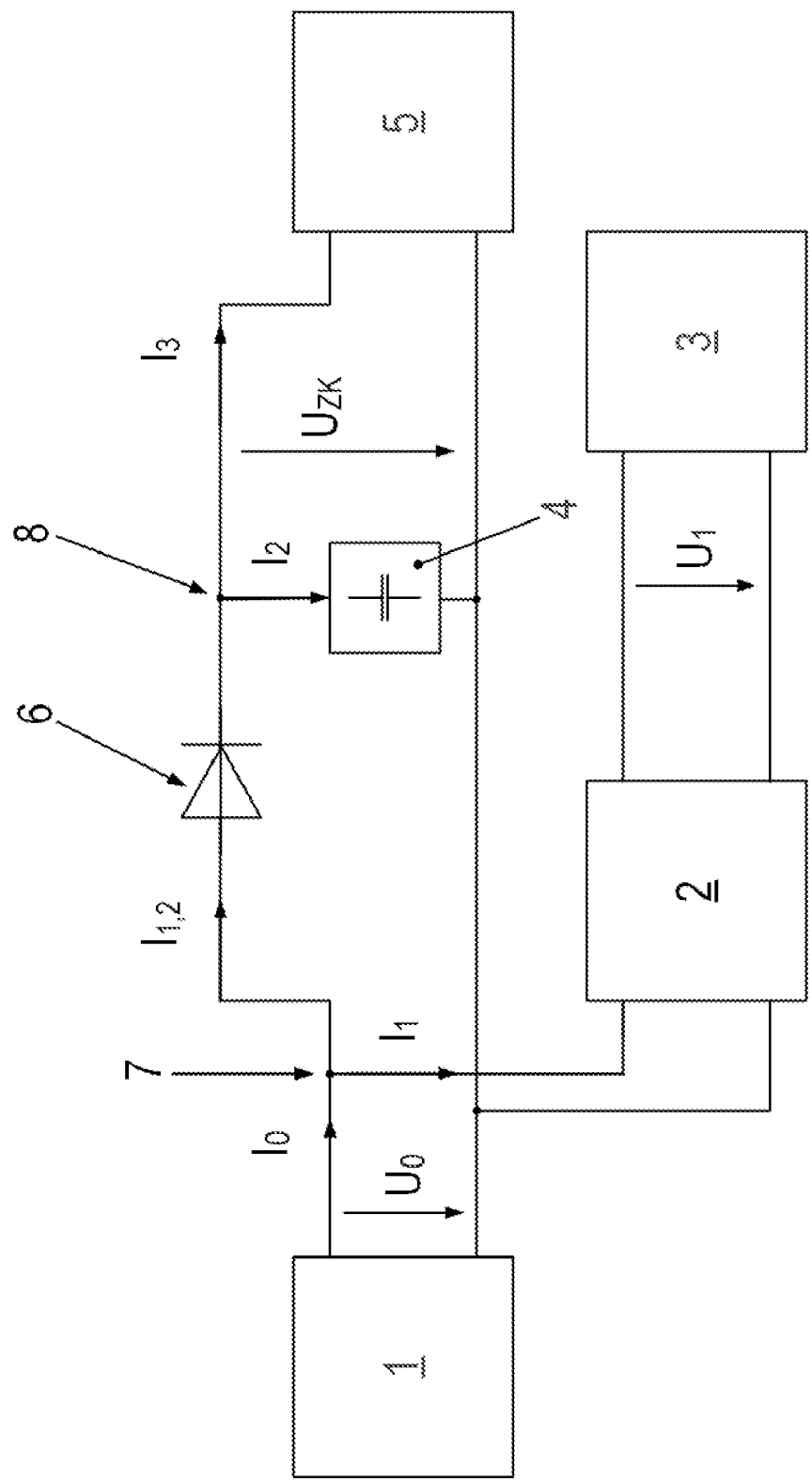

FIG. 1 is a schematic block diagram of those components of an MAS that are assigned to the energy management of the vehicle. For the energy supply, the MAS has an energy supply unit 1, which is in the form of a controllable power source in this exemplary embodiment. For this purpose, the energy supply unit 1 has a regulator, which regulates the supply current $I_0$ of the energy supply unit 1 and, as a result, provides a supply voltage $U_0$. This supply voltage $U_0$ is DC voltage and the supply voltage $U_0$ for an MAS is, for example, in the range from 120 V to 600 V. Whenever a voltage is mentioned herein, it always means DC voltage unless it is explicitly defined as AC voltage.

The energy supply unit 1 for the MAS can be configured in different manners. For example, a simple charging device with a plug-in contact can be implemented, so that the MAS can be supplied with energy by contact at certain charging stations. Likewise, a contact-based energy supply can be implemented while the MAS is in motion, for example, by conductor lines. As an alternative to this, a non-contact power supply can be implemented, for example, an inductive power supply. This can take place through coupled primary and secondary inductors. Both a supply at stationary charging stations and a supply while the MAS is in motion are possible, for example, through primary conductors placed in or on the building's floor.

If an external power supply is present, the supply current $I_0$, which is positive, is provided by the energy supply unit 1. If there is no external energy supply, for example, because the MAS is in motion on a section without conductor lines or an inductive supply, no supply current is provided or the supply current $I_0$ is zero.

The charging device 1 is connected to a bidirectional converter unit 2, to which, in turn, a first energy storage device 3 is connected. In the present example, the bidirectional converter unit 2 is arranged as a bidirectional DC/DC converter and the first energy storage device 3 is arranged as a battery storage device. The bidirectional DC/DC converter 2 therefore makes it possible to supply energy to the battery storage device 3 or to draw energy from the battery storage device 3. The DC/DC converter can be arranged as a non-isolated or as an isolated DC/DC converter in terms of potential.

For example, the battery storage device 3 has voltages $U_1$ in the range of low voltages, e.g., 12 V, 24 V, or 48 V.

The current which is supplied to the DC/DC converter 2 is referred to as the first charging current $I_1$. The first charging current $I_1$ is positive when the battery storage device 3 is being supplied with energy, i.e., it is being charged. The first charging current $I_1$ is correspondingly negative when energy is being drawn from the battery storage device 3, i.e., it is being discharged.

The DC/DC converter 2 optionally converts the supply voltage $U_0$ into the battery voltage $U_1$ when the battery storage device 3 is being charged, or it converts the battery voltage $U_1$ into the supply voltage $U_0$ when the battery storage device 3 is being discharged. Charging and discharging are possible both in the case of an existing external energy supply and in the case without an external energy supply, depending on the requirements of the intralogistic application. The voltage level $U_0$ is therefore provided by the energy supply unit 1 and/or by the DC/DC converter 2.

Furthermore, the charging device 1 is connected to a second energy storage device 4 which is arranged as a double-layer capacitor 4 in this exemplary embodiment. Instead of a double-layer capacitor, an assembly of several double-layer capacitors connected in parallel and/or in series can also be used. The following explanations for a double-layer capacitor therefore apply analogously to a double-layer capacitor device. The double-layer capacitor 4 and the DC/DC converter 2 are connected to the charger 1 in parallel, for example. In addition, an electrical consumer 5 is connected in parallel to the double-layer capacitor 4, which, in this exemplary embodiment, is arranged as a drive device for the traction of the vehicle. For example, the drive device can be implemented as a 3-phase AC motor with a 3-phase inverter connected upstream. For example, the inverter converts the DC voltage present at the inverter into a 3-phase AC voltage, with which the three-phase motor, for example, a squirrel-cage rotor, is operated. The drive device 5 can also have several motors, each of which can be operated by its own inverter. In addition, the inverter can also be arranged with feedback capability, so that, when the drive motors are operated as a generator, energy can be supplied back to charge the double-layer capacitor 4.

In addition to drive devices for traction of the MAS, other consumers are also possible, such as lifting devices for picking up a load or handling devices for moving an object, for example, a robot arm. These devices can be connected to the first electrical consumer 5 in parallel, for example.

In the exemplary embodiment illustrated in FIG. 1, a diode 6 is arranged between a first connection point 7 of the DC/DC converter 2 and a second connection point 8 of the double-layer capacitor 4; the function of the diode will be described later. This diode 6 results in two voltage levels. While voltage level $U_0$ is present at the first connection point 7, the double-layer capacitor 4 and the drive device 5, with the common second connection point 8 thereof, are at voltage level $U_{ZK}$ with intermediate circuit voltage $U_{ZK}$. The double-layer capacitor 4 and the drive device 5 are therefore connected by a common intermediate circuit and isolated from the DC/DC converter 2 via the diode. The DC/DC converter 2, the double-layer capacitor 4, and the drive device 5 can therefore be supplied with the supply voltage $U_0$ if an external energy supply is present. If the voltage in the intermediate circuit $U_{ZK}$ is less than the supply voltage $U_0$, it increases until it has reached the level of the supply voltage $U_0$. Because of the voltage drop across the diode 6, this voltage will be slightly less than the supply voltage $U_0$. However, since the supply voltage $U_0$ is usually in the range of 120 V and more, the voltage drop across the diode 6 is negligible, for example. If there is no external power supply and the DC/DC converter 2 is not supplying any power either, the supply voltage $U_0$ can be less than $U_{ZK}$, while the intermediate circuit voltage is still kept at a positive level by the double-layer capacitor. The diode 6 permanently prevents charge reversal from the double-layer capacitor 4 to the battery storage device 3, i.e., always, that is to say at any point in time. Thus, it is not possible and also not desirable for energy to be transferred from the double-layer capacitor 4 to the battery storage device 3.

The current which is supplied to the double-layer capacitor 4 is referred to as the second charging current $I_2$. The second charging current $I_2$ is positive when the double-layer capacitor 4 is being supplied with energy, i.e., when it is being charged. The second charging current $I_2$ is correspondingly negative when energy is being drawn from the double-layer capacitor 4, i.e., when it is being discharged.

The current which is supplied to the drive device 5 is referred to as the load current $I_3$. The load current $I_3$ is positive when the drive device 5 is being supplied with energy, i.e., the drive motors are being operated as motors. The load current $I_3$ is correspondingly negative when the drive device 5 is supplying energy back, for example, because the drive motors are being operated as a generator during braking.

The diode 6 arranged between connection points 7 and 8 prevents energy from the intermediate circuit from reaching the DC/DC converter 2 or reaching the battery storage device 3 via the DC/DC converter 2. Thus, it is not possible to transfer energy from the double-layer capacitor 4 to the battery storage device 3 at any given time. In other words, a power flow from the double-layer capacitor to the battery storage device is prevented by the diode. A power flow is possible and desirable in the reverse direction. Energy from the battery storage device 3 can therefore be used to increase the voltage $U_{ZK}$ in the intermediate circuit. The double-layer capacitor 4 can therefore be charged by the charger and/or by the battery storage device, while the battery storage device can only be charged by the charger.

The current that flows between the two connection points 7, 8 and therefore through the diode 6 is referred to as the charge-reversal current $I_{1,2}$. The charge-reversal current is positive if current flows from the first connection point 7, i.e., from the DC/DC converter or from the charger 1, to the second connection point 8, i.e., in the direction of the intermediate circuit or in the direction of the double-layer capacitor 5 and the drive device 5. A negative charge-reversal current $I_{1,2}$ is prevented by the diode 6 in the present example embodiment. Energy that was once stored in the double-layer capacitor 4 should no longer be used to charge the battery storage device 3.

Figure 2:
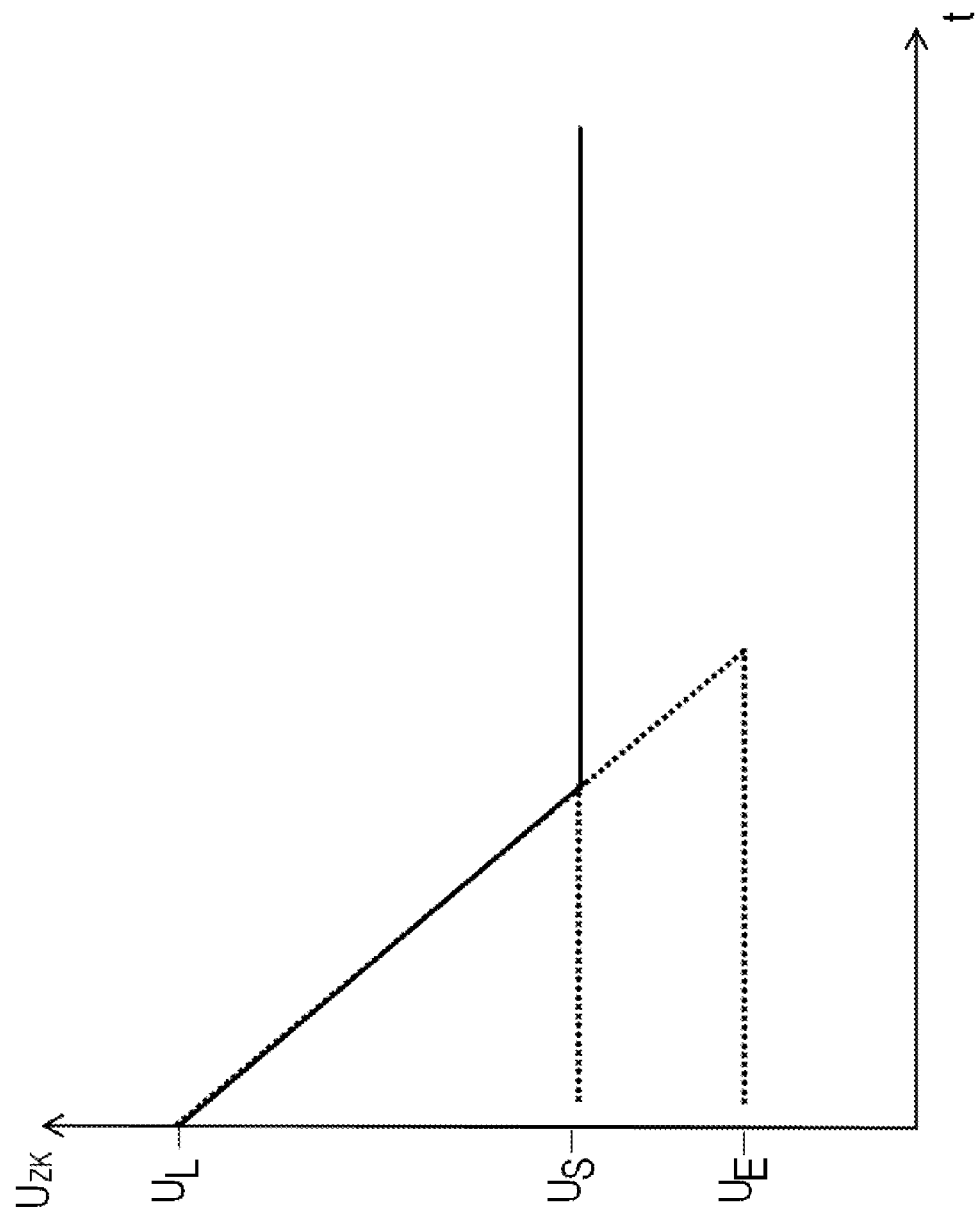
FIG. 2 schematically illustrates the progression of the intermediate circuit voltage $U_{ZK}$ over time for the case in which a consumer is supplied with energy from the intermediate circuit.

The double-layer capacitor 4 has an end-of-charge voltage $U_L$, i.e., a maximum voltage to which it can be charged at maximum, and an end-of-discharge voltage $U_E$, i.e., a minimum voltage which is, for example, greater than zero. These characteristic voltage values are predetermined by the configuration of the double-layer capacitor. Typical values are, for example, $U_L$=350 V and $U_E$=120 V. Therefore, it must be possible to supply the drive device 5 with the necessary power in this voltage range. Therefore, if only the double-layer capacitor 4 is to be used as the single energy storage device, the drive device 5 would be configured for a maximum expected power for the lowest voltage and consequently the greatest current. This would result in larger sizes having to be used for the drive motors, for example. In order to improve the configuration so that smaller sizes can be used, the DC/DC converter 2 with the battery storage device 3 ensures that the intermediate circuit voltage $U_{ZK}$ does not fall below a definable voltage level $U_S$. This is schematically illustrated in FIG. 2 for the case in which the drive device 5 requires energy continuously and there is no external energy supply. The double-layer capacitor 4 is initially fully charged at voltage level $U_L$. Over time, the voltage $U_{ZK}$ in the intermediate circuit drops until it reaches a defined switching voltage $U_S$. At this point in time at the latest, the DC/DC converter 2 is operated such that energy is transferred from the battery storage device 3 into the intermediate circuit in order to keep the voltage level there at least at $U_S$. The intermediate circuit voltage $U_{ZK}$ is ascertainable, for example, by a simple voltage measurement. Overall, it is possible to dimension the drives to be smaller. The voltage $U_S$ at which the switching takes place can therefore be used as the rated voltage for dimensioning the power electronics and the drives and is referred to as the switching voltage $U_S$.

The command for activating the DC/DC converter 2 can be executed, for example, by a vehicle controller. This vehicle controller controls the energy management of the vehicle and the corresponding travel movements. Alternatively or additionally, it is also possible for the DC/DC converter itself to have control electronics, to which the value of the measured intermediate circuit voltage $U_{ZK}$ is provided and which initiates appropriate steps so that energy is transferred into the intermediate circuit if the voltage drops below the switching voltage $U_S$.

The battery storage device has a large capacity and compensates for the weakness of the low energy content of the double-layer capacitor. If the power supplied from the battery storage device into the intermediate circuit corresponds to the average power of an intralogistic application, the voltage at the double-layer capacitor and thus in the intermediate circuit will remain at $U_S$ on average. This leads to favorable operating conditions for the double-layer capacitor. The double-layer capacitor buffers possible power peaks of the drive device, while the battery storage device can be configured for the continuous consumption from the drive device. If greater power reserves are available at the DC/DC converter, the double-layer capacitor can also be recharged to the end-of-charge voltage $U_L$.

For the exemplary values of $U_L$=350 V and $U_E$=120 V mentioned above, the following advantage results as compared to a system with only one double-layer capacitor. Assuming that the maximum current of the power electronics of the drive device is limited to $I_{V,max}$=10 A, a maximum power of $P_{V,max}=U_E\,I_{V,max}$=1,200 W would result in the case of just one double-layer capacitor with $U_E$=120 V. If the switching point is selected for the case with two energy storage devices, for example, at $U_S$=180 V, the result is a maximum power of $P_{V,max}=U_S\,I_{V,max}$=1, 800 W.

If the drive device 5 is operated as a generator, the energy generated thereby can be used to recharge the double-layer capacitor 4. For example, this provides that the voltage present at the double-layer capacitor 4 does not exceed the end-of-charge voltage $U_L$. This can be implemented, for example, using overvoltage protection.

As described, the diode 6 has the task of preventing a charge reversal from the double-layer capacitor 4 to the battery storage device 3. The energy that the double-layer capacitor 4 has absorbed should not reach the battery storage device 3 and should only be available to the drive device 5. As an alternative to the diode, the, e.g., permanent prevention of this power flow can also be represented in terms of regulation or control technology in a further exemplary embodiment. For this purpose, the charge-reversal current $I_{1,2}$ is measured using a current-measuring device. In this case, the current-measuring device replaces the diode illustrated in FIG. 1; otherwise, all previously described units and currents relating to FIG. 1 apply to the further exemplary embodiment. The current-measuring device transmits a detected actual value $I_{1,2\_actual}$ of the charge-reversal current $I_{1,2}$ to the DC/DC converter 2, which includes signal electronics, for example. These signal electronics store a defined minimum charge-reversal current limit $I_{1,2\_min}$, below which the DC/DC converter is deactivated, at least for charging the battery storage device. This means that this deactivation only includes the voltage conversion from voltage level $U_0$ to voltage level $U_1$, while the reverse voltage conversion direction is not deactivated.

Alternatively, a complete deactivation of the DC/DC converter, i.e., switch-off, can also be implemented. The charge-reversal current limit value $I_{1,2\_min}$ is, for example, a positive value and is, e.g., so far above the value zero that the charge-reversal current $I_{1,2}$ does not fall below zero due to possible time delays, i.e., it does not become negative. The control technology therefore prevents a power flow from the double-layer capacitor 4 to the battery storage device 2. The deactivation of the DC/DC converter 2, for example, includes only the voltage conversion from voltage level $U_0$ to voltage level $U_1$. The reverse voltage conversion direction is therefore not deactivated.

A further exemplary embodiment is described in relation to FIGS. 3 and 4. As in the foregoing exemplary embodiment, the charge-reversal current $I_{1,2}$ is measured between the first connection point 7 and the second connection point 8 by a current-measuring device 12 arranged between these connection points. A power flow from the double-layer capacitor to the battery storage device is thus prevented using control technology. The current-measuring device 12 replaces the diode 6 illustrated in FIG. 1. The current-measuring device 12 transmits the detected actual value $I_{1,2\_actual}$ of the charge-reversal current $I_{1,2}$ to the converter device 2, which is described in more detail below. The converter device 2 includes, as described below, a cascade controller 9, a bidirectional DC-DC converter 11, and a throttle 10. The designation of the currents or the description of the current directions is the same as in the exemplary embodiment first described above. The DC-DC converter 11 converts the converter voltage designated as $U_W$ into the battery voltage $U_1$ and vice-versa. Since there is no diode, the voltage level $U_0$ is equal to the intermediate circuit level $U_{ZK}$. This converter voltage $U_W$ can differ from the intermediate circuit voltage $U_{ZK}$ since an inductor 8 is arranged between the DC voltage converter 11 and the first connection point 7. In the present example, this inductor 10 is part of the converter device 2, so that the voltage with which the converter device 2 can be supplied corresponds to the supply voltage $U_0$.

The charge reversal from the double-layer capacitor 4 to the battery storage device 3 is prevented with control technology by the cascade controller 9 as described below. In addition to the actual value of the charge-reversal current $I_{1,2\_actual}$, the cascade controller 9 is also supplied with the actual value $U_{ZK\_actual}$ of the intermediate circuit voltage $U_{ZK}$. The actual value $U_{ZK\_actual}$ is detected using a voltage measurement.

FIG. 4 illustrates the cascade control implemented in the cascade controller 9, including a current regulator 15 with a superimposed voltage regulator 13. A setpoint limiter 14 is arranged between the two regulators 13, 15.

First, a target value for the intermediate circuit voltage $U_{ZK\_target}$ is specified, for example, by the vehicle controller. This is compared with the detected actual value of the intermediate circuit voltage $U_{ZK\_actual}$ and the difference is provided to the voltage regulator 13 as an input variable. The voltage regulator 13 generates a target value for the charge-reversal current $I_{1,2\_target}$ as an output variable. In order to avoid negative charge-reversal currents $I_{1,2}$, the target value for the charge-reversal current is limited by a limiter 14 to values that are greater than a minimum charge-reversal current limit value $I_{1,2\_min}$. In other words, values for target value $I_{1,2\_target} > I_{1,2\_min}$ are not changed by the limiter 14, and values for target value $I_{1,2\_target} < I_{1,2\_min}$ are set by the limiter 14 to the minimum charge-reversal current limit value $I_{1,2\_min}$. The minimum charge-reversal current limit value $I_{1,2\_min}$ is a non-negative value. $I_{1,2\_min}=0$ is also possible for an ideal regulator. The new value for the target value of charge-reversal current $I_{1,2\_target}$ thusly generated by the limiter 14 is compared with the actual value of charge-reversal current $I_{1,2\_actual}$ and the difference is provided to the current regulator 15 as an input variable. Finally, the current regulator generates a control value for converter voltage $U_{W\_control}$ as an output variable. This means that converter voltage $U_{W\_control}$ is only set and not regulated.

In the situation described with respect to FIG. 2, i.e., when there is no external energy supply ($I_0=0$) and the drive device 5 is continuously supplied with energy, the cascade controller could be used to set the target value of intermediate circuit voltage $U_{ZK\_target}$ to the switching voltage $U_S$. As long as the intermediate circuit voltage $U_{ZK}$ is greater than the switching voltage $U_S$, i.e., $U_{ZK\_actual} > U_S = U_{ZK\_target}$ the voltage regulator 13 will attempt to reduce the intermediate circuit voltage $U_{ZK}$ by specifying a target value for the charge-reversal current $I_{1,2\_target}$, which is negative. Due to the limitation, however, this target value is set to the minimum charge-reversal current limit value $I_{1,2\_min}$, for example, $I_{1,2\_min}=0.1$ A.

If the charge-reversal current is still above this limit value, i.e., $I_{1,2\_actual} > 0.1$ A, the voltage regulator 15 will vary the control variable $U_{W\_control}$ such that the charge-reversal current is reduced, i.e., the battery storage device 3 does not support the double-layer capacitor 4. The limit value $I_{1,2\_min}$ provides that the cascade controller can still react in a timely manner when this limit is undershot, so that the charge-reversal current $I_{1,2}$ does not become negative.

If the intermediate circuit voltage $U_{ZK}$ falls below the switching voltage $U_S$ due to the energy consumption of the drive device 5, the current regulator 13 will specify a greater positive target value $I_{1,2\_target}$ in order to keep the voltage level at $U_S$.

Even in other situations in which a negative charge-reversal current $I_{1,2}$ could result, for example, a sudden drop in the external energy supply or energy being supplied back by the drive device 5, the cascade controller 9 provides that, in the end, there is no power flow from the double-layer capacitor 4 to battery storage device 3. In this context, it should be pointed out that in the present description a power flow, for example, from the double-layer capacitor 4 to the battery storage device 3, is always understood to mean a charge transfer which contributes significantly to a change in the corresponding energy content of an energy storage device.

LIST OF REFERENCE CHARACTERS

1 Energy supply unit
2 Bidirectional DC/DC converter
3 First energy storage device
4 Second energy storage device
5 Electrical consumer
6 Diode
7 First connection point
8 Second connection point
9 Cascade controller
10 Throttle
11 DC converter
12 Current-measuring device
13 Voltage regulator
14 Limiter
15 Current regulator
$U_L$ End-of-charge voltage
$U_S$ Switching voltage
$U_E$ End-of-discharge voltage
$I_0$ Supply current
$I_1$ First charging current
$I_2$ Second charging current
$I_{1,2}$ Charge-reversal current
$I_3$ Load current

The invention claimed is:

1. A method for operating an electric vehicle that includes a first energy storage device, a second energy storage device, an energy supply unit adapted to provide energy to charge the first energy storage device and/or the second energy storage device, and a first electrical consumer connected to the second energy storage device via an intermediate circuit, the first energy storage device being connected to the energy supply unit via a bidirectional converter unit, the second energy storage device being connected to the energy supply unit, comprising:
    delivering a first power flow from the first energy storage device to the second energy storage device in response to an intermediate circuit voltage in the intermediate circuit falling below a predefinable voltage; and
    preventing a second power flow from the second energy storage device to the first energy storage device at all times.

2. The method according to claim 1, wherein the electric vehicle is arranged as a driverless, mobile assistant system for an intralogistics application, the first energy storage device includes a rechargeable battery storage device, the second energy storage device is chargeable and dischargeable, includes a double-layer capacitor device, and/or is chargeable and dischargeable faster than the first energy storage device, the energy supply unit is adapted to provide energy periodically to charge the first energy storage device and/or the second energy storage device, and the first electrical consumer includes a drive device for travel movement of the vehicle, a lifting device, and/or a handling device.

3. A method for operating an electric vehicle that includes a first energy storage device, a second energy storage device, an energy supply unit adapted to provide energy to charge the first energy storage device and/or the second energy storage device, and a first electrical consumer connected to the second energy storage device via an intermediate circuit, the first energy storage device being connected to the energy supply unit via a bidirectional converter unit, the second energy storage device being connected to the energy supply unit, comprising:
    delivering a first power flow from the first energy storage device to the second energy storage device in response to an intermediate circuit voltage in the intermediate circuit falling below a predefinable voltage; and preventing a second power flow from the second energy storage device to the first energy storage device;
wherein energy is supplied to the energy supply unit with or without contact and/or energy is supplied to the energy supply unit periodically during a trip.

4. The method according to claim 1, wherein the second energy storage device includes an end-of-charge voltage and an end-of-discharge voltage, and a value of the predefinable voltage is greater than a value of the end-of-discharge voltage and less than a value of the end-of-charge voltage.

5. The method according to claim 1, wherein a value of the predefinable voltage depends on an average power required by the first electrical consumer.

6. The method according to claim 1, wherein a value of the predefinable voltage is varied dynamically during operation of the vehicle.

7. The method according to claim 1, wherein a value of the predefinable voltage is equal to a quotient of a maximum power required by the first electrical consumer and a maximum permissible current for the first electrical consumer.

8. The method according to claim 1, wherein the second power flow is prevented by a diode arranged between the second energy storage device and the converter unit.

9. The method according to claim 1, wherein an actual value of a charge-reversal current flowing between a first connection point and a second connection point, the first connection point being connected to the energy supply unit and the converter unit, the second connection point being connected to the second energy storage device and the electrical consumer, and wherein the second power flow is prevented by deactivating the converter device, at least for charging the first energy storage device, in response to a detected actual value of the charge-reversal current falls below a minimum charge-reversal current limit value.

10. The method according to claim 9, wherein the actual value of the charge-reversal current flowing between the first connection point and the second connection point is detected by a current-measurement device, and wherein the minimum charge-reversal current limit value is not negative.

11. The method according to claim 1, wherein an actual value of a charge-reversal current flowing between a first connection point and a second connection point is detected, the first connection point being connected to the energy supply unit and the converter unit, the second connection point being connected to the second energy storage device and the electrical consumer, an actual value of the intermediate circuit voltage is detected, the converter includes a throttle, a DC voltage converter, and a regulator with a cascade controller, the second power flow being prevented in that the cascade controller sets or regulates a converter voltage present at the DC voltage converter as a function of detected actual values of the charge-reversal current and the intermediate circuit voltage to the extent that a negative charge-reversal current is prevented.

12. The method according to claim 11, wherein the actual value of the charge-reversal current is detected by a current-measurement device, and the actual value of the intermediate circuit voltage is detected by a voltage measurement.

13. The method according to claim 11, wherein the cascade controller includes a current regulator, a superimposed voltage regulator, and a limiter arranged between the voltage regulator and the current regulator, and the limiter limits a target value for the charge-reversal current to values greater than a minimum charge-reversal current limit value.

14. The method according to claim 13, wherein the minimum charge-reversal is not negative.

15. The method according to claim 4, wherein the first power flow occurs when the intermediate circuit voltage is less than the end-of-charge voltage and a voltage in the first energy storage device is above a predefinable minimum voltage.

16. The method according to claim 1, wherein the vehicle includes further electrical consumers, all of the electrical consumers being connected to the second energy storage device via the intermediate circuit.

17. The method according to claim 16, wherein all of the consumers are connected to the second energy storage device via the intermediate circuit in parallel.

18. An electric vehicle, comprising:
a first energy storage device;
a second energy storage device;
an energy supply unit adapted to provide energy to charge the first energy storage device and/or the second energy storage device;
a first electrical consumer connected to the second energy storage device via an intermediate circuit;
wherein the first energy storage device is connected to the energy supply unit via a bidirectional converter unit;
wherein the second energy storage device is connected to the energy supply unit; and
wherein the vehicle is configured to deliver a first power flow from the first energy storage device to the second energy storage device in response to an intermediate circuit voltage in the intermediate circuit falling below a predefinable voltage and to prevent a second power flow from the second energy storage device to the first energy storage device at all times.

19. The vehicle according to claim 18, wherein the vehicle is arranged as a driverless, mobile assistance system for an intralogistics application, the first energy storage device includes a rechargeable battery storage device, the second energy storage device is chargeable and dischargeable, includes a double-layer capacitor device, and/or is chargeable and dischargeable faster than the first energy storage device, and the energy supply unit is adapted to provide energy periodically to charge the first energy storage device and/or the second energy storage device.

20. The vehicle according to claim 18, wherein the vehicle is adapted to perform a method that includes:
delivering the first power flow from the first energy storage device to the second energy storage device in response to the intermediate circuit voltage in the intermediate circuit falling below the predefinable voltage; and
preventing the second power flow from the second energy storage device to the first energy storage device at all times.

21. The vehicle according to claim 18, wherein the energy supply unit includes a controllable power source, and/or the first energy storage device is arranged on the electric vehicle separably and replaceably.

22. The vehicle according to claim 18, wherein the first energy storage device includes an overvoltage protection, an undervoltage protection, and/or an overcurrent protection by a current measurement and/or voltage measurement.

23. The vehicle according to claim 18, wherein the first energy storage device includes an overtemperature protection by a temperature measurement.

24. The vehicle according to claim 18, wherein the second energy storage device includes an overvoltage protection and/or an overcurrent protection by a current measurement and/or voltage measurement.

25. The vehicle according to claim 18, wherein the second energy storage device includes an overtemperature protection by a temperature measurement.

26. An electric vehicle, comprising:
- a first energy storage device;
- a second energy storage device;
- an energy supply unit adapted to provide energy to charge the first energy storage device and/or the second energy storage device;
- a first electrical consumer connected to the second energy storage device via an intermediate circuit;
- wherein the first energy storage device is connected to the energy supply unit via a bidirectional converter unit;
- wherein the second energy storage device is connected to the energy supply unit;
- wherein the vehicle is configured to deliver a first power flow from the first energy storage device to the second energy storage device in response to an intermediate circuit voltage in the intermediate circuit falling below a predefinable voltage and to prevent a second power flow from the second energy storage device to the first energy storage device at all times; and
- wherein the vehicle is adapted to perform a method that includes:
- delivering the first power flow from the first energy storage device to the second energy storage device in response to the intermediate circuit voltage in the intermediate circuit falling below the predefinable voltage; and
- preventing the second power flow from the second energy storage device to the first energy storage device at all times.

* * * * *